United States Patent
DeTella et al.

(10) Patent No.: US 10,565,596 B2
(45) Date of Patent: Feb. 18, 2020

(54) HOSTED SENSITIVE DATA FORM FIELDS FOR COMPLIANCE WITH SECURITY STANDARDS

(71) Applicant: PAYPAL, INC., San Jose, CA (US)

(72) Inventors: Kyle DeTella, Chicago, IL (US); Evan Hahn, San Francisco, CA (US); Eric Mrak, San Francisco, CA (US); George Carpenter, V, San Francisco, CA (US); Thomas Klun, Chicago, IL (US); John Downey, Chicago, IL (US); Rohit Turumella, San Francisco, CA (US); Mickey Reiss, Chicago, IL (US); Benjamin Mills, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/599,085

(22) Filed: May 18, 2017

(65) Prior Publication Data

US 2017/0255943 A1  Sep. 7, 2017

Related U.S. Application Data

(63) Continuation of application No. 14/983,120, filed on Dec. 29, 2015.

(Continued)

(51) Int. Cl.
*G06Q 20/40* (2012.01)
*G06Q 20/34* (2012.01)
(Continued)

(52) U.S. Cl.
CPC ....... *G06Q 20/40975* (2013.01); *G06Q 20/34* (2013.01)

(58) Field of Classification Search
CPC ............ G06Q 10/1093; G06Q 20/023; G06Q 30/0207; G06Q 40/06; G06Q 10/105;
(Continued)

(56) References Cited

U.S. PATENT DOCUMENTS

| | | | | |
|---|---|---|---|---|
| 4,658,290 A | * | 4/1987 | McKenna | G06Q 30/02 348/E7.072 |
| 5,351,995 A | * | 10/1994 | Booker | G06F 3/0483 283/117 |

(Continued)

OTHER PUBLICATIONS

Examination Report dated Oct. 15, 2018 issued in Australian Application No. 2017265004 (6 pages).

*Primary Examiner* — Johann Y Choo
(74) *Attorney, Agent, or Firm* — Haynes and Boone LLP

(57) ABSTRACT

Systems and methods providing, by a third party, input form fields for sensitive data on a web page provided by an organization. A user may request a web page from an organization, such as a merchant's checkout web page, that requires entry of sensitive data. The merchant's checkout web page may include reference to a script file that provides hosted sensitive data form fields. In response to rendering the merchant web page in a web browser of the user, a request to provide sensitive data form fields on the merchant web page may be received. The request may include a call to a function in a scripting file provided by the third party, and the provided file may cause one or more inline frames to be rendered in the web browser, each inline frame including a sensitive data form field. Data entered by the user in the sensitive data form fields may be received by a third party payment processor device.

20 Claims, 5 Drawing Sheets

Related U.S. Application Data

(60) Provisional application No. 62/165,611, filed on May 22, 2015.

(51) Int. Cl.
  *G06Q 20/38* (2012.01)
  *G06Q 20/20* (2012.01)

(58) Field of Classification Search
  CPC ........... G06Q 30/0253; G06Q 30/0255; G06Q 30/0256; G06Q 30/0277; G06Q 20/3821; G06Q 30/0273; G06Q 30/0613; G06Q 30/0254; G06Q 30/0271; G06Q 20/0609; G06Q 30/0635; G06Q 30/0214; G06Q 30/0269; G06Q 20/12; G06Q 20/4018; G06F 3/1204; G06F 9/4448; G06F 8/44
  See application file for complete search history.

(56) References Cited

U.S. PATENT DOCUMENTS

| | | | | |
|---|---|---|---|---|
| 6,067,565 | A * | 5/2000 | Horvitz | H04L 29/06 709/218 |
| 6,412,008 | B1 * | 6/2002 | Fields | H04L 67/2823 709/205 |
| 6,434,556 | B1 * | 8/2002 | Levin | G06F 16/338 |
| 6,801,224 | B1 * | 10/2004 | Lewallen | G06F 8/38 715/744 |
| 7,389,256 | B1 * | 6/2008 | Adams | G06Q 20/02 705/35 |
| 7,640,512 | B1 * | 12/2009 | Appling | G06F 16/9577 715/771 |
| 7,865,414 | B2 | 1/2011 | Fung et al. | |
| 8,335,728 | B1 * | 12/2012 | Dahodwala | G06Q 40/02 705/24 |
| 8,583,911 | B1 | 11/2013 | Miller | |
| 9,626,713 | B2 | 4/2017 | Natarajan | |
| 2002/0087467 | A1 * | 7/2002 | Mascavage, III | G06Q 20/02 705/39 |
| 2005/0144452 | A1 * | 6/2005 | Lynch | G06F 21/33 713/170 |
| 2005/0240522 | A1 | 10/2005 | Kranzley et al. | |
| 2005/0246181 | A1 | 11/2005 | Kawahara | |
| 2006/0005157 | A1 * | 1/2006 | Saxena | G06Q 10/0633 717/101 |
| 2006/0184874 | A1 * | 8/2006 | Kimiya | G06F 17/2247 715/207 |
| 2007/0192245 | A1 | 8/2007 | Fisher et al. | |
| 2007/0250563 | A1 * | 10/2007 | Lo | G06F 16/9577 709/203 |
| 2007/0276675 | A1 * | 11/2007 | Gabrick | G06Q 10/10 705/310 |
| 2007/0299735 | A1 * | 12/2007 | Mangalick | G06Q 30/06 705/26.41 |
| 2008/0052135 | A1 * | 2/2008 | Ziade | G06Q 40/00 705/4 |
| 2008/0319869 | A1 | 12/2008 | Carlson et al. | |
| 2009/0299878 | A1 * | 12/2009 | Keresman, III | G06Q 20/12 705/26.1 |
| 2010/0094755 | A1 | 4/2010 | Kloster | |
| 2010/0174620 | A1 | 7/2010 | Stringfellow et al. | |
| 2010/0223183 | A1 * | 9/2010 | Smith | G06F 21/34 705/44 |
| 2010/0299588 | A1 * | 11/2010 | Dattilo | G06F 3/1205 715/234 |
| 2011/0087560 | A1 | 4/2011 | West | |
| 2011/0213678 | A1 * | 9/2011 | Chorney | G06Q 30/06 705/26.61 |
| 2012/0016766 | A1 * | 1/2012 | Raizada | G06Q 20/085 705/26.25 |
| 2012/0089481 | A1 | 4/2012 | Iozzia et al. | |
| 2012/0143770 | A1 | 6/2012 | Pauker et al. | |
| 2012/0331376 | A1 * | 12/2012 | Gorokhovsky | G06F 9/451 715/234 |
| 2013/0198038 | A1 * | 8/2013 | Mowatt | G06Q 10/10 705/26.41 |
| 2013/0232037 | A1 * | 9/2013 | Edwards | G07G 1/0036 705/27.1 |
| 2013/0332253 | A1 | 12/2013 | Shiffert et al. | |
| 2014/0033228 | A1 * | 1/2014 | Lucash | H04L 67/04 719/313 |
| 2014/0052617 | A1 | 2/2014 | Chawla et al. | |
| 2014/0229821 | A1 | 8/2014 | Abrahami | |
| 2014/0259135 | A1 * | 9/2014 | Postrel | H04L 63/0807 726/7 |

\* cited by examiner

HOSTED SENSITIVE DATA FORM FIELDS FOR COMPLIANCE WITH SECURITY STANDARDS

CROSS REFERENCE TO RELATED APPLICATIONS

This continuation patent application claims priority to and the benefit of U.S. patent application Ser. No. 14/983,120 filed on Dec. 29, 2015 and U.S. Provisional Patent Application Ser. No. 62/165,611, filed on May 22, 2015, the contents of which both are incorporated by reference in their entirety.

BACKGROUND

Field

The present disclosure generally relates to systems and methods for securely providing data in compliance with data security standards.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider. Such payment service providers can make transactions easier and safer for the parties involved. Purchasing with the assistance of a payment service provider from the convenience of virtually anywhere using a mobile device is one main reason why on-line and mobile purchases are growing very quickly.

Companies that process, store, or transmit sensitive data including credit card information, such as merchants offering goods or services on the Internet, must comply with standards set by various organizations, such as the Payment Card Industry Data Security Standard (PCI DSS). Compliance with the PCI DSS and other similar standards can be difficult for on-line merchants, as it may require extensive investment in computing equipment and other costs. Accordingly, some on-line merchants outsource payment functions, and therefore PCI DSS compliance, to third party payment processors, who are therefore responsible for compliance with industry standards. However, outsourcing these functions to third parties may have drawbacks, as the appearance and behavior of a third party form accepting payment information may not be consistent with the appearance and behavior of the on-line merchant's website.

Thus, there is a need for an improved system and method for complying with security standards for accepting sensitive data.

Figure 1:
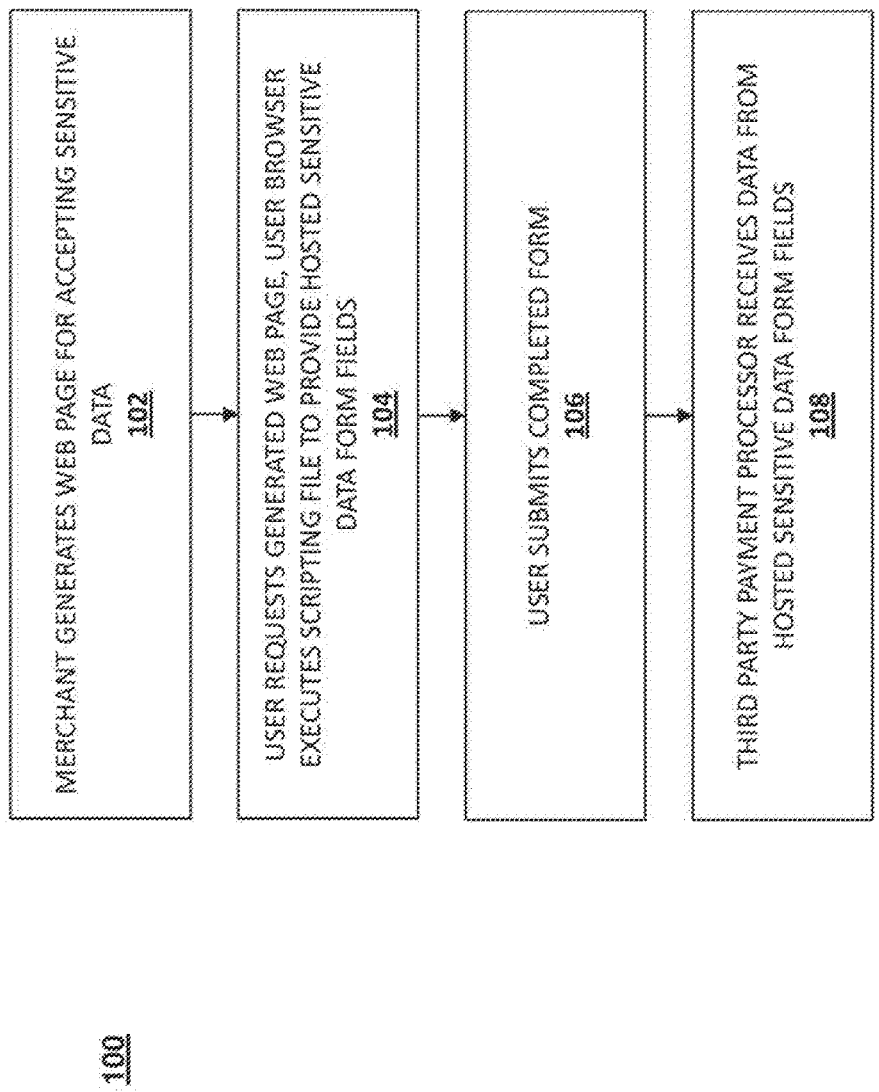
FIG. 1 is a flow chart illustrating an embodiment of a method for providing, by a third party, input form fields for sensitive data on a web page provided by an organization.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing, by a third party, input form fields for sensitive data on a web page provided by an organization. In one embodiment, the organization may generate a web page for a user to submit sensitive data. For example, the organization may be a merchant generating a checkout page for a user to purchase goods, which may require the user to enter in personal financial data like credit card information. Within the web page, the organization may designate one or more containers for each form field of sensitive data for the user to enter. The organization may also include a reference to a third party script file within the generated web page, and one or more appearance options for each field of sensitive data for the user to enter. A user may request the generated web page over a network such as the Internet, using a web browser. In response, the third party may provide the one or more sensitive data form fields, which are rendered in the web browser of the user as inline frames according to the appearance options specified by the organization. The sensitive data form fields are therefore hosted by the third party, and not the organization. The user may enter his or her data in the sensitive data form fields. In response to submitting the form, the third party script file may cause the sensitive data entered by the user to be transmitted securely to the third party, and the remainder of the data to be transmitted to the organization. Accordingly, the organization does not store, receive or otherwise maintain the sensitive data, which may reduce the need for the organization to comply with security standards.

As described above, accepting credit card information or other sensitive data over the Internet may require compliance with various security standards, including but not limited to the PCI DSS standard. For example, the PCI DSS standard has secure network requirements, cardholder data requirements, periodic testing and monitoring of network resources, and other requirements. Within the standard, individual credit card issuers may impose their own additional requirements.

Accordingly, compliance with such standards can be technically difficult and costly. Failure to comply with such standards may lead to an inability to accept credit cards as a method of payment. While some merchants accepting such sensitive data may choose to comply with these standards by implementing various safeguards, various third parties provide payment processing services, such as credit card processing services, that shift the burden of compliance with standards from the merchant to the third party. Thus, the third party is responsible for compliance with the security standards, and sensitive data is received by and maintained by the third party instead of the merchant.

One method that third parties may use to accept such sensitive data is to provide a software development kit (SDK) which provides user interface elements for accepting sensitive data. A merchant may use the SDK to easily add sensitive data form fields to a payment or checkout form without extensive coding, and without the need to implement security compliance with security standards. However, such SDKs may have drawbacks or tradeoffs for such simple implementation.

In particular, these SDKs may not be highly customizable, and may have a standard appearance that is inconsistent with the merchant's website. Thus, because the appearance of the sensitive data fields does not appear like the rest of the website, the user may become confused and unsure of the safety of entering his or her sensitive data. Additionally, sensitive data form fields provided by an SDK may not support translation for other languages or localization for different currencies. The SDK may also not allow the merchant to customize a checkout experience; for example, the user may be forced to enter in all necessary credit card information at one time, instead of entering the data on distinct web pages.

Thus, in one embodiment, a payment processor or other third party may provide an application programming interface (API) that provides hosted sensitive data form fields. Each sensitive data form field may be provided as a separate inline frame (iframe), and the API may support customization of the appearance of each inline frame. In one embodiment, the customization of each inline frame occurs using a style sheet language such as cascading style sheets, or a similar language. In one embodiment, the hosted sensitive data form fields are provided by a JavaScript file provided and hosted by a third party payment processor and which is referenced in a web page of the merchant and rendered by a browser of a user accessing the web page.

From the merchant's perspective, usage of the API has significant benefits. In one embodiment, the merchant adds a minimal amount of code to its web page, such as a checkout web page, for each sensitive data field utilized by the merchant (e.g., credit card number, expiration date, card security code, etc.) and hosted by the third party. Further, in one embodiment, the merchant may style the hosted fields by specifying style sheet language variables for color, font, font family, font size, font size adjustment, font stretch, font style, font variant, font variant alternates, font variant for capitals, font variant for East Asian languages, font variant ligatures, font variant for numbers, font weights, line heights, outlines, opacity, text shadow, transitions, and font smoothing for each sensitive data field utilized by the merchant.

Referring now to FIG. 1, a method 100 of providing input form fields for sensitive data on a web page provided by an organization is illustrated. The input form fields are hosted by a third party payment processor. In the method 100 described below, an organization, such as a merchant, wishes to provide a checkout web page that accepts payment by credit card. Accepting payment by credit card requires compliance with various standards, as described above; in the example of method 100 the merchant sets up a relationship with a third party payment processor such as, for example, Braintree of Chicago, Ill., to perform the credit card functions, including the receipt, storing, and secure maintenance of the credit card data. Thus, the merchant may, in one example, set up an account with the third party payment processor, and provide details about the merchant to start accepting payments by credit card.

The method 100 begins at block 102, where the merchant generates a web page for accepting sensitive data. Thus, in one embodiment, the merchant may create a web page on a merchant device executing web server software which hosts the merchant's web site. In one embodiment, in generating a web page, such as a checkout web page, to accept sensitive data with hosted form fields for the sensitive data, the merchant may include a JavaScript file provided and hosted by the third party payment processor in the checkout web page. This may be performed in a script tag in an HTML file, in one embodiment. In one embodiment, including the JavaScript file requires a reference to a third party payment processor device, such as a server of the third party payment processor, and may be referred to by a uniform resource locator (URL). In one embodiment, the merchant may configure integration of hosted fields for sensitive data using a setup function provided by the JavaScript file, which may accept one or more variables such as a payment processor client token and one or more options for the function. The options for the setup function may include a reference to a document object model (DOM) of a checkout form element on the merchant's checkout page, and one or more options for the hosted fields. The setup function may be invoked within the checkout web page.

In one embodiment, the options for the hosted fields include also include an object which includes stylesheet language corresponding to the sensitive data form fields. In one embodiment, the options for the hosted fields also include an identification of a function that is called when an event occurs in the hosted fields rendered on the merchant checkout page. In one embodiment, the options for the hosted fields also include field options for each sensitive data form field included in the merchant's web page. For example, various field options may exist for the credit card number and expiration date fields. In one embodiment, the expiration date field may be split into two fields, expiration month and expiration year. Further, in one embodiment, the options for the hosted fields also include field options for the card verification number (e.g., CVV, CID, or other 3 or 4 digit verification number) and/or postal code or zip code.

Inside each of the credit card number, expiration date, expiration month, expiration year, card verification number, and postal code, various field options may be specified. Such field options may specify, for example, a string used to query a document object model for a container which identifies the particular hosted data field. The string may thus be used to apply the stylesheet options for the particular hosted data field. In one embodiment, the field options may also specify placeholder data for the field. Thus, for example, the expiration month field may initially be populated by a string "MM" signifying that the user should enter a two-digit month number in the expiration month field.

Once the merchant has included the JavaScript file provided by the third party payment processor in the checkout web page, including the variables and options needed for the setup function, the merchant may create the remainder of the checkout form in the web page using HTML. In one embodiment, the merchant may define containers in the HTML web page, in place of typical input elements that would ordinarily be used for sensitive data, such as credit card input fields. Thus, for example, the merchant may add "div" containers for each of the credit card number, card verification number, and expiration date sensitive data form fields.

In one embodiment, after adding the necessary HTML for the checkout form, the merchant may specify the aforementioned options for styling the sensitive data form fields in the options field of the setup function. For each field, the merchant may specify appearance options and other options using a stylesheet language. In one embodiment, the merchant may specify particular options for all sensitive data form fields. In one embodiment, the merchant may specify one or more options for specific sensitive data form fields.

Further, in one embodiment, the merchant may specify element states for the sensitive data form fields; for example, a sensitive data form field may appear blue when it is selected or focused. Similarly, a sensitive data form field may appear green if a valid credit card number is entered, or red if an invalid credit card number is entered. Further, the maximum width and height of each iframe element may also be set by the stylesheet of the merchant.

In one embodiment, the third party may support classes which are toggled on a given container, based on various events. For example, when a sensitive data form field receives and loses focus, a class may be toggled, and the appearance of the field may change. Similarly, when a value entered in a sensitive data form field changes between invalid and valid, a class may be toggled, and the appearance of the field may change. Further, when a value entered in a sensitive data form field becomes complete and valid, the appearance of the field may change in response to a class being toggled. In one embodiment, CSS transition, such as color transitions, may also be specified for various properties.

In one embodiment, the JavaScript file may support one or more event handlers, which may be subscribed to using a callback function (such as "onFieldEvent"). An event object may include a number of different values which can be used to change the appearance of a sensitive data form field in a number of different ways. For example, an event object may have a type variable that returns a focus, blur, or field state change value, each of which can be used to change the appearance of a sensitive data form field. Similarly, the event object can return a Boolean value of true or false based on whether the input field is currently focused. The event object can also return a Boolean value of true or false based on the future validity of the input value. For example, if a user enters in "41" as the first two digits of a credit card number, the future validity of the input value is true; while if a user enters in "4a" as the first two digits of the credit card number, the future validity of the input value is false. This may be used to quickly signal the user that a correction is needed. The event object can also return a Boolean value of true or false depending on whether or not the value of the associated input field is fully qualified and valid. The event object can also return an object with a container referring to a document object model element associated with an event, and a string mapping to one of the sensitive data fields. Further, the event object may also return an object variable with a determined card type based on the credit card number (e.g., Visa, American Express, MasterCard, etc.).

Returning the object variable with a determined card type may be useful, in one example, to provide an accurate length of a credit card number and an accurate length and name of a card security code. For example, American Express card numbers are 15 digits with a 4 digit card verification number, while Visa and MasterCard card numbers are 16 digits with a 3 digit card verification number. Thus, the event object can be used to return a correct card type and thereby verify that the length of the credit card number and card verification number are correct. In one embodiment, the options for the JavaScript function may also include an option to permit payment by a payment service provider, such as PayPal Inc. of San Jose, Calif., instead of by credit card or other payment method.

Once the merchant has generated the web page and added the desired options for the hosted form fields for the sensitive data, method 100 proceeds to block 104. At block 104, a user, such as a customer of the merchant, requests the generated web page. Thus, for example, a user device or payer device, such as a mobile telephone or personal computer, may request the checkout web page over a network, such as the Internet, from the merchant device hosting the merchant's web site. In one embodiment, when a user requests the generated web page, such as a checkout page, the JavaScript file provided and hosted by the third party payment processor may be requested and executed. Thus, for example, the JavaScript file may be requested by the user device's browser and retrieved from a third party payment processor device on which it is stored. The JavaScript file may then be executed by the user device's web browser, and in response, may generate an inline frame for each sensitive data form field used by the merchant web page, using one or more functions in the JavaScript file. In turn, the inline frame for each sensitive data form field used by the merchant web page may be styled according to the various options selected by the merchant, and rendered in the browser of the customer according to those options. The user can then enter in his or her data into each sensitive data form field on the web page. As the user enters in data into the sensitive data form fields, each field may change its appearance according to the events described above. For example, if the user enters in a valid credit card number, the credit card number field may change color to indicate a valid number.

In one embodiment, when the JavaScript file provided and hosted by the third party payment processor is executed, using JavaScript functions, an external inline frame (for example, an inline frame for the web page itself) may emit an asynchronous message to initialize one or more dependencies which generate the hosted sensitive data form fields. In response, the internal inline frames may be generated, one for each hosted sensitive data form field, and inform the external inline frame of their existence. Further, the external inline frame may designate one of the internal inline frames as an orchestrator. In one embodiment, the internal inline frame designated as the orchestrator may be, for example, the credit card number internal inline frame. The orchestrator internal inline frame may request a configuration, and in response, create a model object. The orchestrator may also distribute a reference to the configuration and the model object to the other internal inline frames. To complete the rendering of the sensitive data form fields, the orchestrator may inform the external inline frame that all dependencies have been satisfied, and trigger a "ready" function or variable.

Method 100 then proceeds to block 106, where the user may submit the completed form. In one embodiment, the user selects a submit button to submit the data. In one embodiment, when the setup function of the JavaScript file is executed, it may take over the submit event of the form on the checkout web page. The JavaScript file provided by the third party payment processor may pass the data in the sensitive data form fields to the third party payment processor device, which may be a gateway server or other server of the third party payment processor. Thus, when a user attempts to submit a form, the JavaScript file included in the web page may securely collect the data entered in the sensitive data form fields, and attempt to tokenize the data, such as the credit card information. The data entered in the sensitive data form fields may be securely transmitted to the third party payment processor. In one embodiment, the data entered in the sensitive data form fields is encrypted prior to transmission. In one embodiment, the data is encrypted by a function provided in the JavaScript file, and is encrypted using a public key provided by the third party payment processor. In one embodiment, the form is submitted with a hidden input for a payment method nonce, which may be transmitted to the merchant's web server. The payment method nonce may be used to charge the customer's card. Other information on the checkout web page may be transmitted to a merchant device, such as a web server of the merchant.

Method 100 then proceeds to block 108, where the data is received by the third party payment processor. The third party payment processor may then decrypt the data entered in the sensitive data form fields, and attempt to charge the credit card of the user. For example, a third party payment processor device may communicate with an account provider device (e.g., a credit card company server) to charge the credit card of the user. In one embodiment, the third party payment processor stores the credit card information securely in compliance with applicable security standards.

Thus, because the JavaScript file is hosted by the third party payment processor, and because the sensitive data is transmitted to the third party payment processor and not maintained with the merchant, compliance with standards, such as PCI DSS, is offloaded to the third party payment processor and not the merchant. Further, because the JavaScript file provided by the third party payment processor generates an inline frame for each sensitive data field, malicious JavaScript files cannot be inserted into the sensitive data field or the form to compromise the customer's sensitive data.

In one embodiment, the JavaScript file provided and hosted by the third party payment processor may include additional functionality, such as validating a credit card number, or automatically determining the type of a credit card, based on its number.

Figure 2:
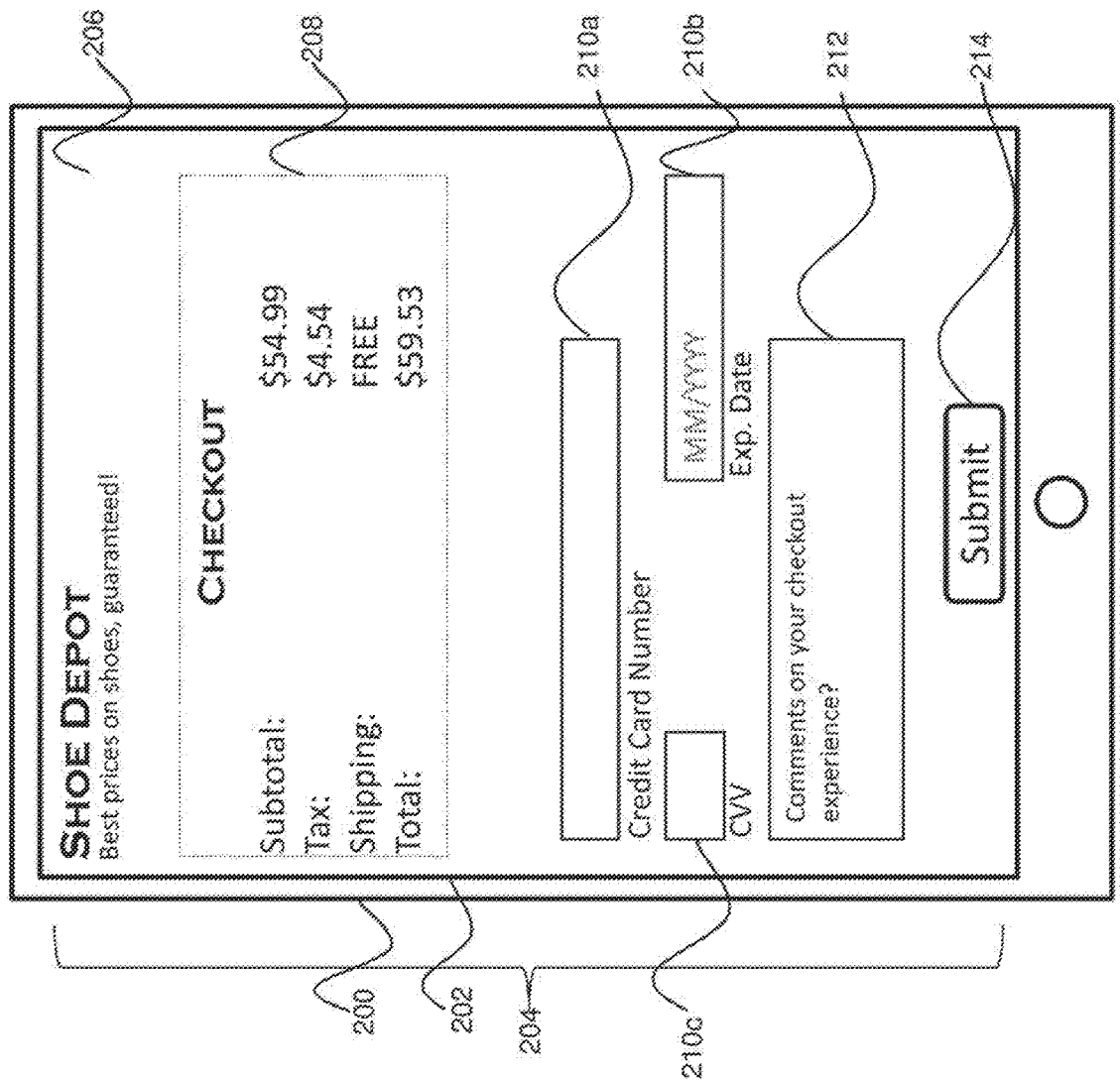
FIG. 2 is a front view illustrating an embodiment of a payer device displaying a checkout web page with input form fields for sensitive data.

Referring now to FIG. 2, an example of a web page with hosted form fields for sensitive data is illustrated. In the example of FIG. 2, a payer device 200, such as a mobile telephone or table computing device of a user, includes a display 202 displaying a web browser 204. In the example of FIG. 2, the web browser 204 displays a checkout web page 206 of a merchant. The checkout web page 206 may display various information, such as a breakdown of costs 208 for a user's purchase. The checkout web page 206 may be requested by the web browser 204 executing on payer device 200 over a network from a merchant device.

Additionally, the checkout web page 206 includes a plurality of hosted form fields for sensitive data 210a-210c. The hosted form fields 210a-210c may include, in the example of FIG. 2, a credit card number field 210a, an expiration date field 210b, and a card verification number field 210c. As described above, each hosted form field for sensitive data may be generated by the web browser of payer device 200 executing functions in a JavaScript file from a third party payment processor. As shown in FIG. 2, the hosted form fields 210a-210c may have the same appearance as the remainder of the checkout web page 206, in that they use the same font and the same font size as the breakdown of costs 208. As described above, the merchant may specify one or more appearance options using a stylesheet language. The appearance options may be passed in as input to a function of the JavaScript file, which uses the options to style the hosted form fields 210a-210c. As explained above, the options may also include placeholder text for one or more hosted form fields. In the example of FIG. 2, the expiration date field has placeholder text of "MM/YYYY" suggesting that the user of payer device 200 should enter in a two digit month and four digit year for the expiration date. The checkout web page 206 may also include one or more form fields 212 which are not provided by the JavaScript file, and may be included by the merchant in creating the checkout web page. The checkout web page 206 also includes submit button 214. As explained above, upon pressing the submit button 214, the information entered into the hosted sensitive data form fields 210a-210c may be securely transmitted over the Internet to a third party payment processor, which may include encrypting the data before transmission. The information entered into form field 212 may be transmitted to the merchant device.

Figure 3:
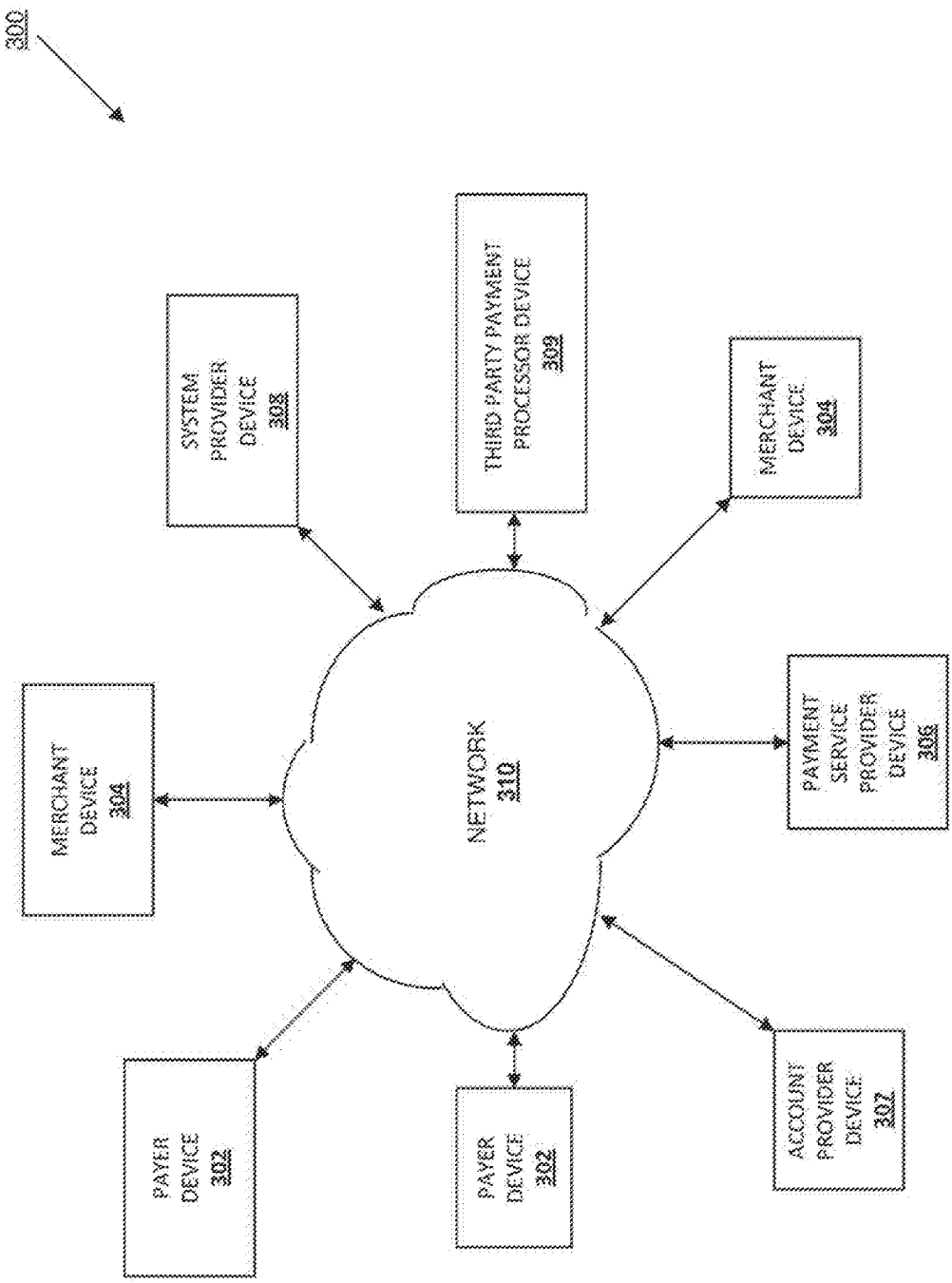
FIG. 3 is a schematic view illustrating an embodiment of a networked system.

Referring now to FIG. 3, an embodiment of a network-based system 300 for implementing one or more processes described herein is illustrated. As shown, network-based system 300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 3 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 300 illustrated in FIG. 3 includes a plurality of payer devices 302, a plurality of merchant devices 304, a payment service provider device 306, an account provider device 307, a system provider device 308, and/or a third party payment processor device 309, in communication over a network 310. Any of the payer devices 302 may be the payer device 200 operated by the users, discussed above. The merchant devices 304 may be the merchant devices discussed above and may be operated by the merchants discussed above. For example, the merchant devices 304 may The payment service provider device 306 may be the payment service provider devices discussed above and may be operated by a payment service provider such as, for example, PayPal Inc. of San Jose, Calif. The account provider devices 307 may be the account provider devices discussed above and may be operated by the account providers discussed above such as, for example, credit card account providers, bank account providers, savings account providers, and a variety of other account providers known in the art. The system provider device 308 may be the system provider devices discussed above and may be operated by the system providers discussed above.

The payer devices 302, merchant devices 304, payment service provider device 306, account provider device 307, system provider device 308, and/or third party payment processor device 309 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 300, and/or accessible over the network 310.

The network 310 may be implemented as a single network or a combination of multiple networks. For example, in various embodiments, the network 310 may include the Internet and/or one or more intranets, landline networks, wireless networks, and/or other appropriate types of networks.

The payer device 302 may be implemented using any appropriate combination of hardware and/or software configured for wired and/or wireless communication over network 310. For example, in one embodiment, the payer device 302 may be implemented as a personal computer of a user in communication with the Internet. In other embodiments, the payer device 302 may be a smart phone, personal digital assistant (PDA), laptop computer, and/or other types of computing devices.

The payer device 302 may include one or more browser applications which may be used, for example, to provide a convenient interface to permit the payer to browse information available over the network 310. For example, in one embodiment, the browser application may be implemented as a web browser configured to view information available over the Internet.

The payer device 302 may also include one or more toolbar applications which may be used, for example, to provide user-side processing for performing desired tasks in response to operations selected by the payer. In one embodiment, the toolbar application may display a user interface in connection with the browser application.

The payer device 302 may further include other applications as may be desired in particular embodiments to provide desired features to the payer device 302. In particular, the other applications may include a payment application for payments assisted by a payment service provider through the payment service provider device 306. The other applications may also include security applications for implementing user-side security features, programmatic user applications for interfacing with appropriate application programming interfaces (APIs) over the network 310, or other types of applications. Email and/or text applications may also be included, which allow the payer to send and receive emails and/or text messages through the network 310. Information feed provider applications may also be included, which allow the payer or user to access an information feed provider as discussed herein. The payer device 302 includes one or more user and/or device identifiers which may be implemented, for example, as operating system registry entries, cookies associated with the browser application, identifiers associated with hardware of the payer device 302, or other appropriate identifiers, such as a phone number. In one embodiment, the user identifier may be used by the payment service provider device 306 and/or account provider device 307 to associate the user with a particular account as further described herein. In one embodiment, the user identifier may be used to view information posts, as described herein.

The merchant device 304 may be maintained, for example, by a conventional or on-line merchant, conventional or digital goods seller, individual seller, and/or application developer offering various products and/or services in exchange for payment to be received conventionally or over the network 310. In this regard, the merchant device 304 may include a database identifying available products and/or services (e.g., collectively referred to as items) which may be made available for viewing and purchase by the payer.

The merchant device 304 also includes a checkout application which may be configured to facilitate the purchase by the payer of items. The checkout application may be configured to accept payment information from the user through the payer device 302, the account provider through the account provider device 307, from the payment service provider through the payment service provider device 306, and/or from the third party payment processor device 309, over the network 310. The merchant device 304 may also include web server software for hosting a merchant web site. The merchant device 304 may also communicate with third party payment processor device 309 over the network 310 to receive an approval for a credit card transaction requested by a user utilizing a payer device 302.

Figure 4:
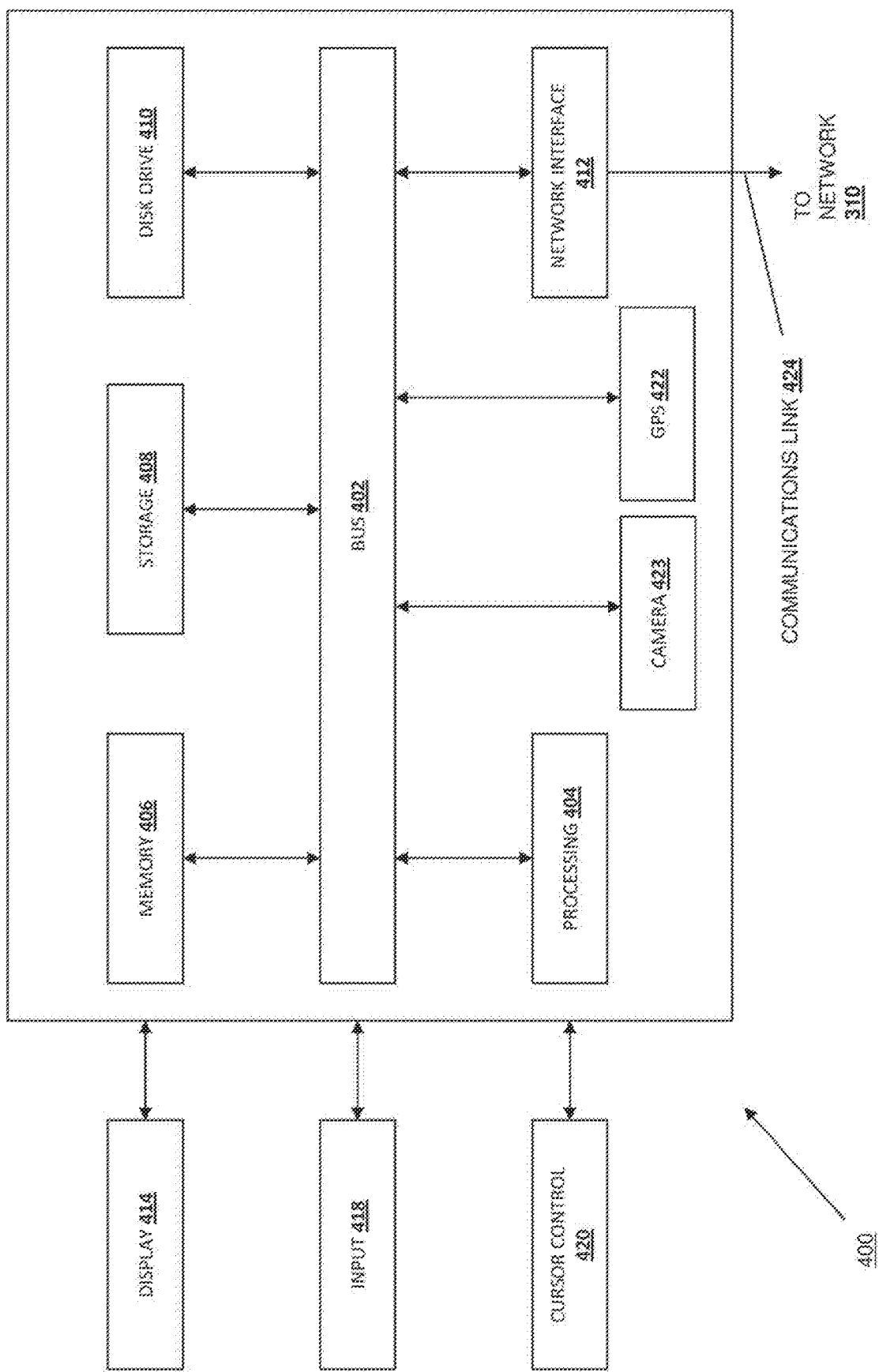
FIG. 4 is a schematic view illustrating an embodiment of a computer system.

Referring now to FIG. 4, an embodiment of a computer system 400 suitable for implementing, for example, the payer device 200 or 302, merchant device 304, payment service provider device 306, account provider device 307, and/or third party payment processor device 309, is illustrated. It should be appreciated that other devices utilized by customers, merchants, payment service providers, third party payment processors, and/or system providers in the system discussed above may be implemented as the computer system 600 in a manner as follows.

In accordance with various embodiments of the present disclosure, computer system 400, such as a computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 608 (e.g., ROM), a disk drive component 410 (e.g., magnetic or optical), a network interface component 412 (e.g., modem or Ethernet card), a display component 414 (e.g., CRT or LCD), an input component 418 (e.g., keyboard, keypad, or virtual keyboard), a cursor control component 420 (e.g., mouse, pointer, or trackball), a location determination component 422 (e.g., a Global Positioning System (GPS) device as illustrated, a cell tower triangulation device, and/or a variety of other location determination devices known in the art), and/or a camera component 423. In one implementation, the disk drive component 410 may comprise a database having one or more disk drive components.

In accordance with embodiments of the present disclosure, the computer system 400 performs specific operations by the processor 404 executing one or more sequences of instructions contained in the memory component 406, such as described herein with respect to the payer device 200 or 302, merchant device 304, payment service provider device 306, account provider device 307, and/or third party payment processor device 309. Such instructions may be read into the system memory component 406 from another computer readable medium, such as the static storage component 408 or the disk drive component 410. In other embodiments, hard-wired circuitry may be used in place of or in combination with software instructions to implement the present disclosure.

Logic may be encoded in a computer readable medium, which may refer to any medium that participates in providing instructions to the processor 404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 410, volatile media includes dynamic memory, such as the system memory component 406, and transmission media includes coaxial cables, copper wire, and fiber optics, including wires that comprise the bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 400. In various other embodiments of the present disclosure, a plurality of the computer systems 400 coupled by a communication link 424 to the network 310 (e.g., such as a LAN, WLAN, PTSN, and/or various other wired or wireless networks, including telecommunications, mobile, and cellular phone networks) may perform instruction sequences to practice the present disclosure in coordination with one another.

The computer system 400 may transmit and receive messages, data, information and instructions, including one or more programs (i.e., application code) through the communication link 424 and the network interface component 412. The network interface component 412 may include an antenna, either separate or integrated, to enable transmission and reception via the communication link 424. Received program code may be executed by processor 404 as received and/or stored in disk drive component 410 or some other non-volatile storage component for execution.

Figure 5:
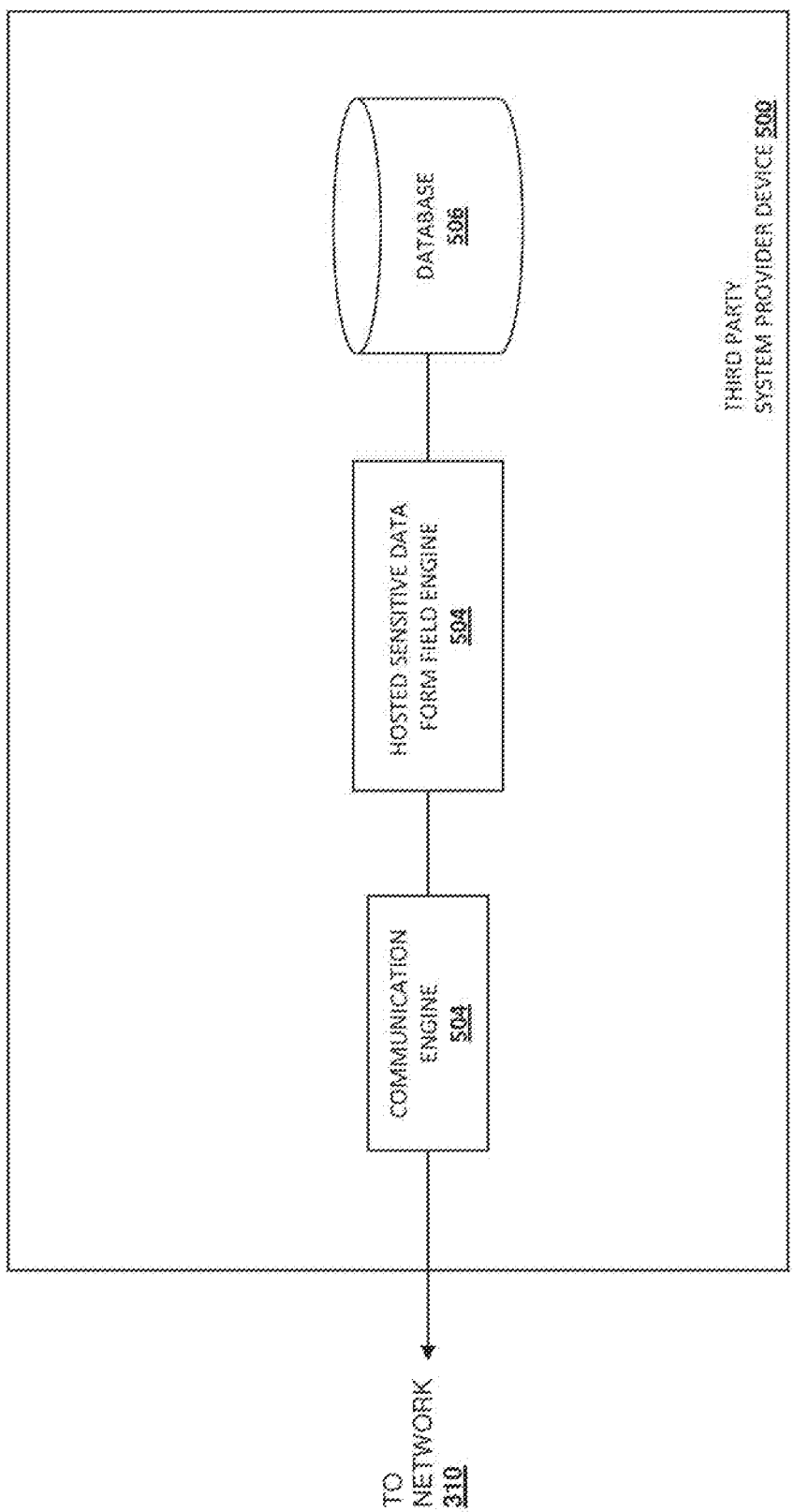
FIG. 5 is a schematic view illustrating an embodiment of a system provider device.

Referring now to FIG. 5, an embodiment of a system provider device 500 is illustrated. In an embodiment, the device 500 may be the third party system provider device 500 discussed above. The device 500 includes a communication engine 502 that is coupled to the network 310 and to a hosted sensitive data form field engine 504 that is coupled to a database 506. The communication engine 502 may be software or instructions stored on a computer-readable medium that allows the device 500 to send and receive information over the network 310. The hosted sensitive data form field engine 504 may be software or instructions stored on a computer-readable medium that is operable to receive, in response to rendering of a merchant web page in a web browser of a user, a request to provide, by the third party, sensitive data form fields on the merchant web page, wherein the request includes a call to a function in a scripting file provided by the third party, cause, by the provided file, one or more inline frames to be rendered in the web browser of a user according to appearance options specified by the merchant, wherein each rendered inline frame includes a sensitive data form field, and receive in response to a user action, data entered by the user in the sensitive data form fields, and/or provide any of the other functionality that is discussed above. While the database 506 has been illustrated as located in the system provider device 500, one of skill in the art will recognize that it may be connected to the hosted sensitive data form field engine 504 through the network 310 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system associated with a payment service provider, the system comprising:
   a non-transitory memory storing instructions; and
   one or more hardware processors coupled to the non-transitory memory and configured to execute the instructions from the non-transitory memory to cause the system to perform operations comprising:
      providing, to a merchant server associated with a merchant, first programming code to be included as part of a merchant webpage hosted by the merchant server, wherein the first programming code is executable by a user device associated with a user after the merchant webpage is accessed by the user device;
      receiving one or more application programming interface (API) calls from the user device based upon the user device executing at least a portion of the first programming code, wherein the one or more API calls include a payment processor client token associated with the merchant and a set of parameters representing a style configuration;
      customizing second programming code based on the set of parameters;
      in response to receiving the one or more API calls, sending the customized second programming code to the user device to be rendered by the user device as part of the merchant webpage, wherein the customized second programming code, when rendered by the user device, (i) generates a set of iframes within the merchant webpage as presented on the user device, wherein the set of iframes comprises a first set of data entry fields configured to receive first input data from the user, and wherein each data entry field in the first set of data entry fields is stylized based on the style configuration represented by the set of parameters included in the one or more API calls, (ii) determines a second set of data entry fields hosted by the merchant server and presented on the merchant webpage, wherein the second set of data entry fields is configured to receive second input data from the user, and (iii) overwrites a submission button of the merchant webpage, wherein the overwriting the submission button causes the user device to transmit the second input data to the merchant server and to transmit the first input data directly to the system without transmitting the first input data to the merchant server when the submission button is selected;

receiving, from the user device in response to the user selecting the submission button on the merchant webpage, the first input data corresponding to the first set of data entry fields;

processing a payment transaction based on the first input data and the payment processor client token included in the one or more API calls; and in response to processing the payment transaction, transmitting a notification indicating that the payment transaction is processed.

2. The system of claim 1, wherein the style configuration indicates a color of the first set of data entry fields.

3. The system of claim 1, wherein the first input data comprises payment card information associated with the user, and wherein the payment transaction is processed based on the payment card information.

4. The system of claim 1, wherein the first input data comprises payment card information associated with the user, and wherein the operations further comprise:

generating a payment token based on the payment card information;

transmitting the payment token to the user device; and subsequent to transmitting the payment token to the user device, receiving a payment request and the payment token from the merchant server, wherein the payment transaction is processed in response to receiving the payment request and based on the payment token.

5. The system of claim 1, wherein the payment processor client token comprises an authorization token.

6. The system of claim 1, wherein the second programming code, when executed by the user device, causes the first input data to be encrypted prior to transmitting the encrypted first input data to the system, and wherein the operations further comprise decrypting the encrypted first input data after receiving the encrypted first input data from the user device.

7. A computer implemented method, comprising:

providing, by a computer system associated with a payment service provider to a merchant server associated with a merchant, first programming code to be included as part of a merchant webpage hosted by the merchant server, wherein the first programming code is executable by a user device associated with a user after the merchant webpage is accessed by the user device;

receiving, by the computer system, one or more application programming interface (API) calls from the user device based upon the user device executing at least a portion of the first programming code, wherein the one or more API calls include an identification token associated with the merchant and a set of parameters representing a style configuration;

in response to receiving the one or more API calls, sending, by the computer system, second programming code customized based on the set of parameters to the user device to be rendered by the user device as part of the merchant webpage, wherein the customized second programming code, when rendered by the user device, (i) generates a set of iframes within the merchant webpage as presented on the user device, wherein the set of iframes comprises a first set of data entry fields configured to receive first input data from the user, and wherein each data entry field in the first set of data entry fields is stylized based on the style configuration represented by the set of parameters included in the one or more API calls, (ii) determines a second set of data entry fields hosted by the merchant server and presented on the merchant webpage, wherein the second set of data entry fields is configured to receive second input data from the user, and (iii) overwrites a submission button of the merchant webpage, wherein the overwriting the submission button causes the user device to transmit the second input data to the merchant server and to transmit the first input data directly to the computer system without transmitting the first input data to the merchant server when the submission button is selected; and receiving, by the computer system from the user device, the first input data corresponding to the first set of data entry fields.

8. The method of claim 7, wherein the style configuration indicates a color of the first set of data entry fields.

9. The method of claim 7, wherein the style configuration indicates a font attribute.

10. The method of claim 7, further comprising prepopulating at least one of the first set of data entry fields rendered on the merchant webpage based on the set of parameters.

11. The method of claim 7, further comprising detecting, using the second programming code, data entered into a first data entry field of the first set of data entry fields is invalid; and causing the user device to display an indication of error on the merchant webpage in response to the detecting.

12. The method of claim 11, wherein the indication of error comprises a change of a color of the first data entry field.

13. The method of claim 7, wherein the style configuration indicates a maximum width of a data entry field.

14. The method of claim 7, wherein the second programming code, when executed by the user device, causes the first input data to be encrypted prior to transmitting the encrypted first input data to the computer system, and wherein the method further comprises decrypting the encrypted first input data after receiving the encrypted first input data from the user device.

15. A non-transitory machine-readable medium having stored thereon machine-readable instructions executable to cause a machine associated with a payment service provider to perform operations comprising:

providing, to a merchant server associated with a merchant, first programming code to be included as part of a merchant webpage hosted by the merchant server, the first programming code is executable by a user device after the merchant webpage is accessed by the user device;

receiving one or more application programming interface (API) calls from the user device based upon the user device executing at least a portion of the first programming code, wherein the one or more API calls include an identification token associated with the merchant and a set of parameters representing a style configuration;

customizing second programming code based on the set of parameters;

in response to receiving the one or more API calls, sending the customized second programming code to the user device to be rendered by the user device as part of the merchant webpage, wherein the customized second programming code, when rendered by the user device, (i) generates a set of iframes within the merchant webpage as presented on the user device, wherein the set of iframes comprises a first set of data entry fields configured to receive first input data from the user, and wherein each data entry field in the first set of data entry fields is stylized based on the style configuration represented by the set of parameters included in the one or more API calls, (ii) determines a second set of data entry fields hosted by the merchant server and presented on the merchant webpage, wherein the second set of data entry fields is configured to receive second input data from the user, and (iii) overwrites a submission button of the merchant webpage, wherein the overwriting the submission button causes the user device to transmit the second input data to the merchant server and to transmit the first input data directly to the machine without transmitting the first input data to the merchant server when the submission button is selected; and receiving, from the user device in response to the user selecting the submission button on the merchant webpage, the first input data corresponding to the first set of data entry fields.

16. The non-transitory machine-readable medium of claim 15, wherein the second programming code causes at least one of the first set of data entry fields to provide an indication when data entered into the at least one of the first set of data entry fields is determined to be valid.

17. The non-transitory machine-readable medium of claim 16, wherein the indication is a change of a color of the at least one of the first set of data entry fields.

18. The non-transitory machine-readable medium of claim 15, wherein the first input data comprises payment card information, and wherein the operations further comprise processing a payment transaction based on the payment card information without transmitting, to the merchant server, the payment card information.

19. The non-transitory machine-readable medium of claim 15, wherein the second programming code, when executed by the user device, causes the first input data to be encrypted prior to the receiving transmitting the encrypted first input data to the machine, and wherein the operations further comprise decrypting the encrypted first input data after receiving the encrypted first input data from the user device.

20. The non-transitory machine-readable medium of claim 15, wherein the style configuration indicates at least one of a language, a font color, a font type, a font size, a text opacity, a text shadow, or a font smoothing.

* * * * *